United States Patent
Campbell et al.

(10) Patent No.: US 7,415,410 B2
(45) Date of Patent: Aug. 19, 2008

(54) IDENTIFICATION APPARATUS AND METHOD FOR RECEIVING AND PROCESSING AUDIBLE COMMANDS

(75) Inventors: William Campbell, Bolton, MA (US); Robert Gardner, Gilbert, AZ (US); Charles Broun, Scottsdale, AZ (US)

(73) Assignee: Motorola, Inc., Schaumberg, IL (US)

( * ) Notice: Subject to any disclaimer, the term of this patent is extended or adjusted under 35 U.S.C. 154(b) by 814 days.

(21) Appl. No.: 10/329,586

(22) Filed: Dec. 26, 2002

(65) Prior Publication Data
US 2004/0128131 A1 Jul. 1, 2004

(51) Int. Cl.
G10L 17/00 (2006.01)
(52) U.S. Cl. ................................. 704/246; 704/273
(58) Field of Classification Search ................ 704/246, 704/250, 273, 275
See application file for complete search history.

(56) References Cited

U.S. PATENT DOCUMENTS

| | | | |
|---|---|---|---|
| 5,623,539 A | 4/1997 | Bassenyemukasa et al. | |
| 5,712,625 A | 1/1998 | Murphy | |
| 5,872,927 A | 2/1999 | Shiels et al. | |
| 5,897,616 A * | 4/1999 | Kanevsky et al. | 704/246 |
| 5,917,891 A | 6/1999 | Will | |
| 5,930,751 A | 7/1999 | Cohrs et al. | |
| 5,930,804 A * | 7/1999 | Yu et al. | 707/104.1 |
| 6,016,476 A * | 1/2000 | Maes et al. | 705/1 |
| 6,073,101 A * | 6/2000 | Maes | 704/275 |
| 6,088,669 A | 7/2000 | Maes | |
| 6,108,592 A | 8/2000 | Kurtzberg et al. | |
| 6,161,090 A * | 12/2000 | Kanevsky et al. | 704/246 |
| 6,167,117 A | 12/2000 | Will | |
| 6,219,639 B1 * | 4/2001 | Bakis et al. | 704/246 |
| 6,393,305 B1 * | 5/2002 | Ulvinen et al. | 455/563 |
| 6,411,933 B1 * | 6/2002 | Maes et al. | 704/273 |
| 6,421,453 B1 * | 7/2002 | Kanevsky et al. | 382/115 |
| 6,510,415 B1 * | 1/2003 | Talmor et al. | 704/273 |
| 6,519,563 B1 * | 2/2003 | Lee et al. | 704/246 |

OTHER PUBLICATIONS

"Speaker Identification using Cepstral Analysis", Nazar, ISCON 2002, Aug. 16-17, 2002; vol. 1, pp. 139-143.*
Saete et al., "*A VQ Speaker Identification System in Car Environment for Personalized Infotainment*", Robert Bosch, GmbH, Hildesheim, Germany; Proceedings of the Speaker Recognition Workshop, Jun. 2001.
Heck et al., "*Integrating Speaker and Speech Recognizers: Automatic Identity Claim Capture for Speaker Verification*", Nuance Communications, Menlo Park, California; Proceedings of the Speaker Recognition Workshop, Jun. 2001.

* cited by examiner

*Primary Examiner*—Michael N Opsasnick
(74) *Attorney, Agent, or Firm*—Lawrence J. Chapa

(57) ABSTRACT

An audible command can be utilized to both permit identification of the speaker and to permit subsequent actions that comprise a corresponding response to the audible command when the identity of the speaker correlates with that of a previously authorized individual. Such identification can be supplemented with other identification mechanisms. Hierarchical levels of permission can be utilized, with or without confidence level thresholds, to further protect the device against unauthorized access and/or manipulation.

24 Claims, 2 Drawing Sheets

IDENTIFICATION APPARATUS AND METHOD FOR RECEIVING AND PROCESSING AUDIBLE COMMANDS

TECHNICAL FIELD

This invention relates generally to identification and/or verification of an individual, and more particularly to voice-based identification of an individual.

BACKGROUND

There are many devices (or device features) that should preferably be limited to specific individuals. It is known to attempt to limit use of such devices through incorporation of various identifying mechanisms. Such mechanisms include biometric-based approaches (using, for example, fingerprints, retinal patterns, and speech recognition/voice pattern recognition) and knowledge-based or device-based approaches (using, for example, passwords and personal identification numbers, radio frequency based tags, and magnetically-encoded cards and identification tags).

For some applications, these kinds of approaches are often acceptable. In many other settings, however, issues concerning identification execution time, cost, security requirements and the like render such solutions less than optimum. In yet other settings, the obvious existence of the identification process and identification requirement is itself undesirable. Existing solutions tend to require a discrete user activity that exclusively serves the identification process and purpose. Such discrete solutions tend to add both complexity (and possibly corresponding user training requirements) and an increase to overall incremental transactional time requirements for the activity at hand.

BRIEF DESCRIPTION OF THE DRAWINGS

The above needs are at least partially met through provision of the identification apparatus and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a user's audible command is automatically processed with respect to previously developed identification information in order to correlate the speaker with a likely identity. Based upon the results of that correlation process, the user's audible command is then automatically responded to in a predetermined way. Pursuant to one embodiment, the audible command can correspond to at least one of a plurality of user-controllable parameters for a device (such as, for example, a two-way wireless communications device). In effect, these embodiments permit identification of a user in real-time in conjunction with the processing of a verbally issued command.

Pursuant to one embodiment, the previously developed identification information comprises biometric information previously extracted from previous audible samples. Depending upon the embodiment, the resultant biometric information can comprise text independent biometric information, text dependent biometric information, or even a combination of both.

Pursuant to one embodiment, one or more levels of permission status can be utilized and processed in combination with the audible command itself and the likely identity of the user to facilitate ascertaining whether the user has an appropriate permission level to permit acceptance and implementation of the command itself. If desired, a temporal aspect can be introduced as well (for example, to determine whether the user has sought to implement a current command within a required predetermined time of having previously entered an earlier command).

If desired, such identification can be used to positively deny acceptance of a given command from a given individual rather than to positively facilitate acceptance of the command.

Figure 1:
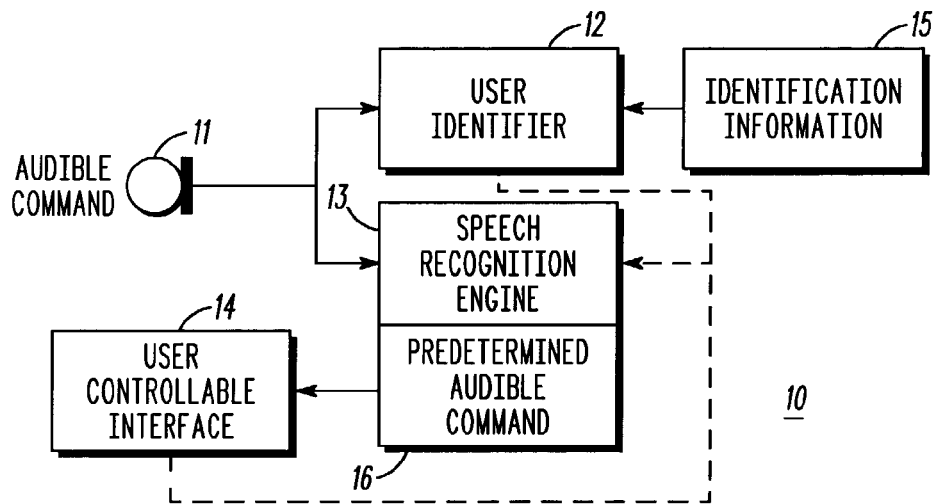
FIG. 1 comprises a block diagram as configured in accordance with an embodiment of the invention.

Referring now to the drawings, and in particular to FIG. 1, a platform 10 suitable to support and facilitate such identification generally includes a speech transducer 11, a user identifier 12, a speech recognition engine 13, and a user controllable interface 14. Such a platform 10 can be wholly or partially realized through use of a shared integrated platform (such as an appropriately configured microprocessor of programmable gate array and/or through use of dedicated circuitry or discrete logic elements as well understood in the art).

The speech transducer 11 will typically comprise one or more microphones. The speech transducer 11 serves, in this embodiment, to at least receive audible commands as uttered by a user and to convert such audible information into corresponding electrical impulses. Pursuant to these various embodiments, the audible command will typically comprise one of a plurality of audible commands and will have a pre-existing correlated relationship with one of a plurality of user-controllable parameters for the device this platform serves with (for example, the device can comprise a two-way wireless communication device and the user-controllable parameters can include parameters such as volume, channel selection, and other features as appropriate and/or desired). In general, additional stages (such as gain, filtering, analog-to-digital conversion, and the like) will also likely be used in a commercially viable embodiment. Such additional stages are well understood in the art and hence are not shown here to preserve focus and for the sake of brevity.

The user identifier 12 serves to receive the output of the speech transducer 11 and to determine a likely identity for the user who uttered the corresponding audible command. The user identifier 12 has access to identification information 15 (stored, for example, in memory) to facilitate this determination. The identification information 15 comprises previously developed identification information comprising, at least in part, biometric information extracted from previous audible samples for this (or other) users. In a preferred embodiment, the biometric information comprises text independent biometric information, but text dependent biometric information alone or in combination with text independent biometric information can be used if desired. Both text independent and text dependent biometric information mechanisms are known in the art and can be used here to good effect. In general, such mechanisms tend to extract and characterize audiblization features that tend to be individually unique to a given speaker and collectively substantially unique to a given speaker. By preferably using text independent biometric information, the identification information can be readily utilized to identify a likely speaker of a given audible command regardless of the textual content of the audible command itself. In either case, in general, the text dependent or text independent biometric information is developed from previous audibilizations of each user for whom identification is desired and again in accordance with well understood prior art technique.

So configured, the user identifier 12 extracts at least one item of characterizing biometric information from an audible command as received via the speech transducer 11 and compares at least portions of the characterizing biometric information with at least one item of identifying information to determine at least a likelihood that the audible command was uttered by a particular user. In a preferred embodiment, the characterizing biometric information as is extracted from the audible command will equate with and be of the same form and type as the biometric information that comprises the identification information described earlier. The user identifier 12 then provides this resultant identification determination to the speech recognition engine 13, to the user controllable interface 14, or both as desired and appropriate to a given embodiment and configuration. In general, the user identifier 12 provides the identification information to an appropriate location where it can be used to otherwise facilitate the various teachings set forth herein.

The speech recognition engine 13 can be any known or hereafter developed speech recognition mechanism that will generally serve to recognize the textual content of a verbalized communication such as the audible command. Also as desired, the speech recognition engine 13 can be of the speaker dependent or speaker independent variety as well understood in the art. In a preferred embodiment, there exist one or more predetermined commands 16 that each correlate to a particular user-controllable parameter. In this embodiment these commands 16 are available to the speech recognition engine 13 to facilitate a determination by the speech recognition engine 13 as to whether a given audible command matches any of the predetermined audible commands 16. (If desired, a comparison between the speech as recognized and such predetermined audible commands can be effected elsewhere and as appropriate to the capabilities of a given platform.)

When an audible command corresponds to one of the predetermined audible commands 16 (and also when the speaker is otherwise identified as disclosed below), a corresponding output causes the user controllable interface 14 to effect the parameter control that corresponds to that particular command. So configured, this platform 10 permits recognition of the textual content of an audible command to permit correlation of that command with a specific user-controllable parameter and action. This platform 10 also permits over-riding permission and security control of such processes based upon a likely identity of the speaker of the audible command as described below in more detail. It will be appreciated that, in a preferred embodiment, the speaker need not annunciate any dedicated identification facilitation expression(s) to achieve these ends. Instead, the audible command itself can serve to both permit identification of the speaker and corresponding compliance with the command itself.

Figure 2:
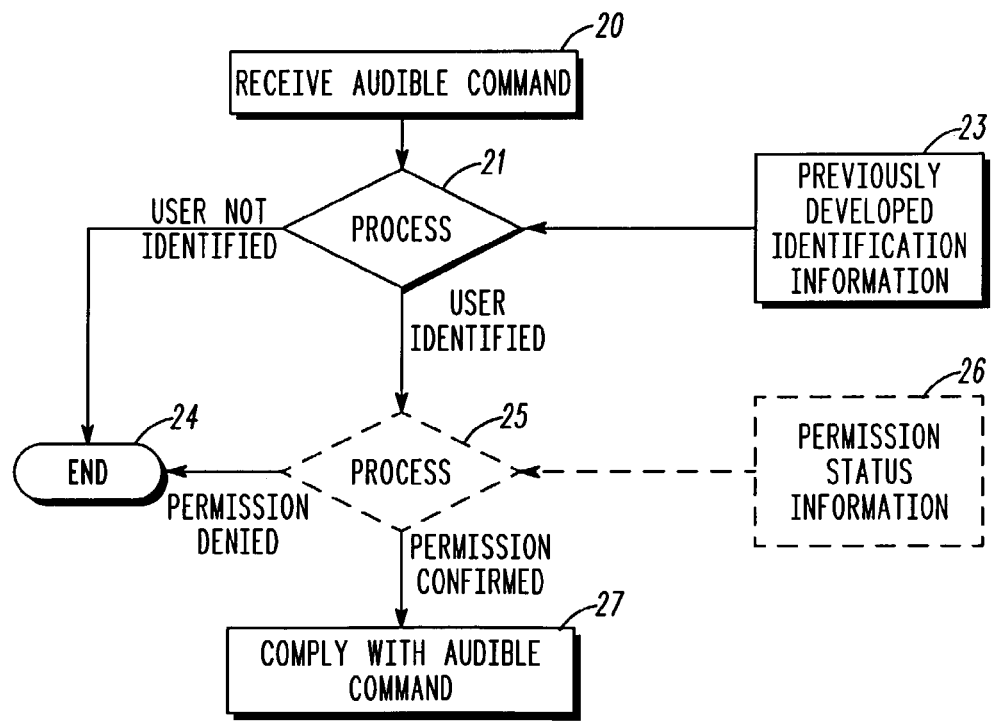
FIG. 2 comprises a flow diagram as configured in accordance with an embodiment of the invention.

Referring now to FIG. 2, various processes that can be implemented by the above platform 10 (or other appropriate platforms) will be described. Upon receiving 20 an audible command, the platform processes 21 the audible command as described above. In particular, extracted characterizing content of the audible command is compared against previously developed identification information 23. The identification information 23 correlates to specific individuals. This processing 21, therefore, serves to determine whether a likely identification of the speaker can be had. When the user can not be identified (at least to an acceptable level of confidence), the process 21 can simply conclude 24. So configured, the audible command will then be essentially ignored and no resultant change to the user controllable interface 14 will occur. When, however, the process 21 can provide an appropriate identification of the speaker (again, at least to an acceptable level of confidence), the command process can continue.

Pursuant to one embodiment, the command process can simply conclude with compliance 27 with the audible command itself (wherein the textual content of the audible command has been recognized as described above and correlated to a specific user-controllable parameter).

Pursuant to another embodiment, it may be desirable to introduce one or more additional levels of control and/or permission. In particular, following likely identification of the user, an additional process 25 can determine whether the specific identified individual constitutes a user that has been previously associated with an appropriate corresponding permission status 26 (for the specific audible command at issue or for all audible commands in general, as desired). When true, the process can again continue with compliance 27 with the audible command. When the permission check determines, however, that the user either does not have permission (in general and/or for this specific command) or, if so configured, that the user has a specific level of denial associated with him or her, the process 25 can conclude 24 without permitting compliance 27 with the audible command.

This permission check process 25 can support greater sophistication if desired. Pursuant to one embodiment, for example, the plurality of user-controllable parameters can include a plurality of hierarchically organized user-controllable parameters. To illustrate, and referring momentarily to FIG. 3, a "radio" 30 parameter can comprise a parameter that must be asserted prior to having access to three other parameters, "volume," 31 "channel," 32 and "special" 33. In turn, the "volume" 31 parameter must be asserted prior to having access to the two parameters "increase" 34 and "decrease" 35. A corresponding permission can be associated with each hierarchical level or tier and/or with each (or some of the) commands. So configured, permission to accept a given audio command (such as "increase" 34 in this illustration) from a given user can be predicated upon having already received a hierarchically required command (such as "volume" 31 in this illustration) by this same user (and, if desired, a further requirement can be that these commands by an identified individual having appropriate corresponding permissions are also received within a predetermined period of time of one another and/or that there be no intervening other commands).

So configured, a variety of permission and control schemes can be readily supported with the basic teachings and embodiments set forth above. For example, an audible command can be simply implemented upon identifying the speaker of that command based upon the audible command itself. Or, if desired, one or more levels or points of permission as correlate to specific commands and/or individuals can be utilized to further control which user controllable parameters are submitted to control and variation by any given individual even when otherwise identified by the system.

Figure 4:
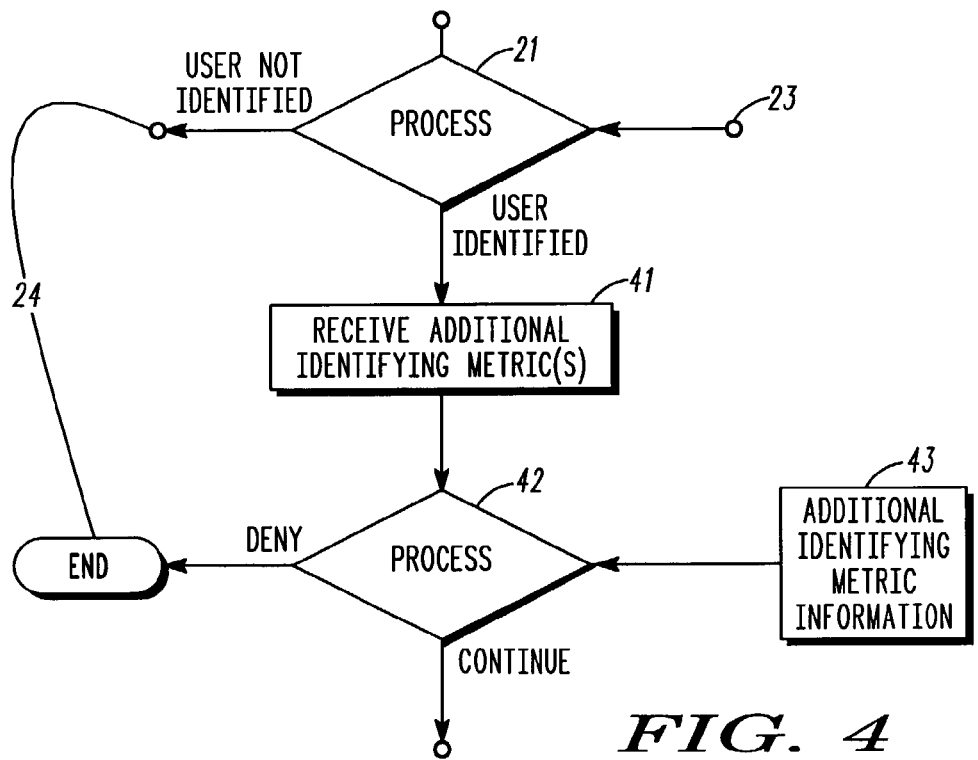
FIG. 4 comprises a detail flow diagram as configured in accordance with an embodiment of the invention.

For some purposes, yet additional assurances regarding identification may be desired. In addition to ascertaining a likely identity of the user, supplemental indicia may also be considered to meet such a need. For example, with reference to FIG. 4, after making an initial determination 21 of the identity of the user as described above, additional identifying metric(s) can be received 41. Such supplemental identifying metrics can include any such indicia (including but not limited to biometric content (such as a retinal or iris patterns, a face pattern, a lip movement pattern, or a fingerprint pattern), identifying information content such as a password or personal identification number, or other identifying indicia such as an identifying card, a handwriting sample, and so forth). Such additional identifying metric(s) can be received 41 either via a corresponding portal that comprises an integral part of the basic platform 10 itself or that is appurtenant thereto.

Once received 41, the additional identifying metric(s) is processed 42 with respect to previously determined additional identifying metric information 43 to determine whether an appropriate match exists. If not, the process can conclude 24 and thereby deny accommodation of the audible command. Otherwise, when the additional identifying metric(s) proves valid, the process can continue as otherwise set forth above.

In the illustration above, such supplemental identifying metric serves to essentially comprise an additional parallel layer of required identification and authentication. If desired, such information could also be used to better inform the identification of the user via the voice analysis described herein. In particular, the supplemental identifying metric can be used to establish a single particular user. The user identifier 12 can then be used to determine whether that particular user in fact appears to have likely been the speaker who uttered the audible command.

So configured, when the platform 10 comprises a part of a device such as a two-way wireless communications device, speech recognition can be readily utilized to permit functional control of the device without also creating an undue risk that unauthorized individuals or utterances will mischievously impact the device. The benefits of this should be readily apparent for applications such as firefighter and police radio settings. In addition, many of these approaches provide satisfactory identification/permission-based controls without requiring that time or attention be paid to identification-unique utterances or actions. Instead, the user need only provide the desired audible command. The device can then both determine the identity of the user and provide an appropriate response that corresponds to the command itself, thereby saving execution time as well as providing a considerably more intuitive user interface. In fact, many of these embodiments provide such transparent identification capability that they require virtually no training for the user whatsoever.

It is possible, of course, that a given user cannot always be identified with 100% assurance as based upon a single uttered command, and particularly when the comparison metrics are based upon text independent biometric information. In instances where this presents a considerable concern, however, the hierarchical command structure having a corresponding tiering of permissions/denials can be utilized to nevertheless generally assure that unauthorized individuals do not have undue access to the device. To illustrate this point, consider the following example.

Figure 3:
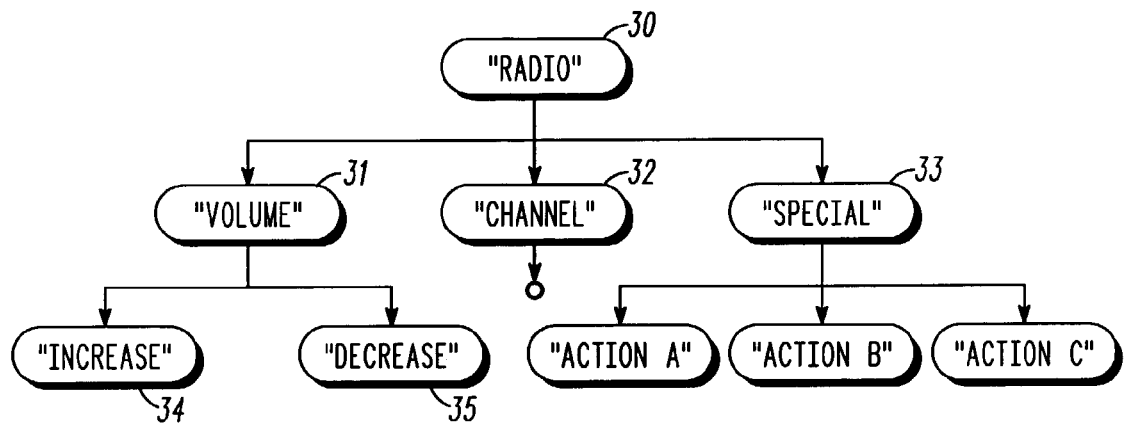
FIG. 3 comprises a schematic view of an illustrative hierarchical command tree as configured in accordance with an embodiment of the invention.

With reference to FIG. 3, a user may utter the command "radio" and the earlier described processes might determine the identify of the speaker as being a particular given authorized individual with only a 60% degree of assurance. For present purposes, however, that degree of likelihood may be sufficient and accepted. When the user then later utters the command "increase," the process can refine the initial determination as based upon this fresh input of exemplary voice. This may permit, for example, the confidence level to be raised to 85% that the speaker is indeed the previously identified individual. If this level of assurance is deemed sufficient to permit a user to assert the corresponding command, then the command can be validated as described above. If, however, the level of assurance is not sufficient to permit a user to assert a particular command, then that particular audible command can be refused. Repeated utterances by the user of this denied command may then be used as further grist for analysis to permit an upgrading of the identification and thereby to permit a genuinely authorized individual to effect the desired command.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
    receiving an audible command from a user;
    automatically processing at least portions of the audible command with respect to previously developed identification information to correlate the user with a likely identity;
    automatically responding to the audible command in a predetermined way as a function, at least in part, of the likely identity, wherein the function of likely identity includes a confidence level that the user has been correctly correlated with the likely identity, and the confidence level is compared against a respective one of a plurality of predefined threshold levels respectively corresponding to each of a plurality of different audible commands.

2. The method of claim 1 wherein automatically responding to the audible command in a predetermined way comprises automatically denying the audible command when the likely identity correlates with a user that has been previously associated with corresponding denial status.

3. The method of claim 1 wherein automatically responding to the audible command in a predetermined way as a function, at least in part, of the likely identity includes automatically responding to the audible command in a predetermined way as a function, at least in part, of the likely identity and of a second identifying metric.

4. The method of claim 3 wherein automatically responding to the audible command in a predetermined way as a function, at least in part, of the likely identity and of a second identifying metric includes automatically responding to the audible command in a predetermined way as a function, at least in part, of the likely identity and of a second identifying metric comprising at least one of:
    a predetermined audible expression;
    a retinal pattern;
    an iris pattern;
    a face pattern
    a lip movement pattern a fingerprint pattern;
a handwriting sample;
a password; and
a personal identification number.

5. The method of claim 1 wherein automatically responding to the audible command in a predetermined way comprises automatically complying with the audible command when the likely identity correlates with a user that has been previously associated with corresponding permission status.

6. The method of claim 5 wherein automatically complying with the audible command when the likely identity correlates with a user that has been previously associated with corresponding permission status includes automatically complying with the audible command when the likely identity correlates with a user that has been previously associated with corresponding permission status for all potential audible commands.

7. The method of claim 5 wherein automatically complying with the audible command when the likely identity correlates with a user that has been previously associated with corresponding permission status includes automatically complying with the audible command when the likely identity correlates with a user that has been previously associated with corresponding permission status for at least the audible command.

8. The method of claim 1 wherein automatically processing at least portions of the audible command with respect to previously developed identification information includes automatically processing at least portions of the audible command with respect to previously developed identification information comprising, at least in part, biometric information extracted from previous audible samples.

9. The method of claim 8 wherein the biometric information extracted from previous audible samples comprises, at least in part, text independent biometric information.

10. The method of claim 8 wherein the biometric information extracted from previous audible samples comprises, at least in part, text dependent biometric information.

11. The method of claim 8 wherein automatically processing at least portions of the audible command with respect to previously developed identification information further includes automatically processing at least portions of the audible command with respect to previously developed identification information that includes information that pertains, at least in part, to previous user correlations for previously received audible commands.

12. The method of claim 11 wherein automatically processing at least portions of the audible command with respect to previously developed identification information that includes information that pertains, at least in part, to previous user correlations for previously received audible commands includes automatically processing at least portions of the audible command with respect to previously developed identification information that includes information that pertains, at least in part, to previous user correlations for audible commands that have been received within a predetermined period of time.

13. A method for use with a controllable platform, comprising:
providing a plurality of user-controllable parameters;
associating each of at least some of the plurality of user-controllable parameters with at least one corresponding audible command;
providing identification information that correlates at least one audible parameter with a particular user and associating that particular user with a given permission status;
receiving an audible command from a user;
automatically processing at least portions of the audible command with respect to the identification information to determine whether the user likely comprises the particular user;
when the user likely comprises the particular user, based at least in part on a confidence level that the user is the particular user, and that the confidence level exceeds a corresponding one of a plurality of thresholds associated with the audible command, automatically responding to the audible command in a predetermined way as a function, at least in part, of the given permission status.

14. The method of claim 13 wherein:
providing a plurality of user-controllable parameters includes providing a plurality of hierarchically organized user-controllable parameters; and
automatically responding to the audible command in a predetermined way as a function, at least in part, of the given permission status includes automatically responding to the audible command in a predetermined way as a function, at least in part, of the given permission status and of at least one automatic response to at least one previously received audible command.

15. The method of claim 14 wherein automatically responding to the audible command in a predetermined way as a function, at least in part, of the given permission status and of at least one automatic response to at least one previously received audible command includes automatically responding to the audible command in a predetermined way as a function, at least in part, of the given permission status and of at least one automatic response to at least one previously received audible command, which at least one previously received audible command has a predetermined hierarchical relationship with respect to the audible command.

16. The method of claim 13, wherein providing identification information includes providing biometric information.

17. The method of claim 16 wherein providing biometric information includes providing biometric information as developed from previous audibilizations of the particular user.

18. The method of claim 17 wherein providing biometric information as developed from previous audibilizations of the particular user includes providing text-independent biometric information as developed from previous audibilizations of the particular user.

19. The method of claim 17 wherein providing biometric information as developed from previous audibilizations of the particular user includes providing text-dependent biometric information as developed from previous audibilizations of the particular user.

20. An apparatus comprising:
at least one user controllable interface having a predetermined audible command associated therewith;
a speech transducer;
at least one item of identification information that correlates at least one audible parameter with a particular user;
permission status information that is correlated with the particular user;
a speech recognition engine having an input operably coupled to the speech transducer and having a recognized audible command output operably coupled to the at least one user controllable interface;
a user identifier having an input operably coupled to the speech transducer and being operably responsive to the at least one item of identification information, and having a permission output operably coupled to at least one of the speech recognition engine and the at least one user controllable interface, wherein the user identifier comprises identification means for extracting at least one item of characterizing biometric information from an audible command as received via the speech transducer and for comparing at least portions of the at least one item of characterizing biometric information with the at least one item of identifying information to determine at least a likelihood relative to a plurality of threshold levels that the audible command was uttered by the particular user;

such that the user identifier can identify a source of an audible command as being the particular user and respond by permitting the audible command to control the at least one user controllable interface.

21. The apparatus of claim 20 wherein the apparatus comprises a wireless communications device.

22. The apparatus of claim 21 wherein the wireless communications device comprises a two-way wireless communications device.

23. The apparatus of claim 20 wherein the permission status information comprises biometric information as corresponds to previous utterances of the particular user.

24. The apparatus of claim 23 wherein the biometric information comprises one of:
   text-dependent biometric information; and
   text-independent biometric information.

* * * * *